United States Patent
Millikan et al.

(10) Patent No.: US 6,928,039 B2
(45) Date of Patent: Aug. 9, 2005

(54) METHOD AND APPARATUS FOR THE REDUCTION OF POWER CONSUMPTION IN A COMPACT DISC PLAYER

(75) Inventors: Thomas N. Millikan, Houston, TX (US); Charles E. McCallum, Dallas, TX (US); Sreenivas Kothandaraman, Chennai (IN)

(73) Assignee: Texas Instruments Incorporated, Dallas, TX (US)

( * ) Notice: Subject to any disclaimer, the term of this patent is extended or adjusted under 35 U.S.C. 154(b) by 284 days.

(21) Appl. No.: 10/184,248

(22) Filed: Jun. 28, 2002

(65) Prior Publication Data

US 2003/0021198 A1 Jan. 30, 2003

Related U.S. Application Data

(60) Provisional application No. 60/302,532, filed on Jun. 29, 2001.

(51) Int. Cl.[7] .................................................. G11B 7/00
(52) U.S. Cl. ............................. 369/47.33; 369/47.32; 369/47.3; 369/59.21; 711/112
(58) Field of Search .......................... 369/47.33, 47.32, 369/59.21, 47.3; 711/112

(56) References Cited

U.S. PATENT DOCUMENTS

| | | | |
|---|---|---|---|
| 5,146,347 A | * 9/1992 | Kawakami et al. ......... 386/105 |
| 5,463,601 A | * 10/1995 | Yanagisawa ............. 369/30.26 |
| 5,502,700 A | 3/1996 | Shinada ...................... 369/50 |
| 5,615,187 A | 3/1997 | Shinada ...................... 369/48 |
| 5,640,383 A | 6/1997 | Kamoto et al. .......... 369/275.3 |
| 5,712,836 A | 1/1998 | Kamoto et al. .............. 369/50 |
| 5,754,427 A | 5/1998 | Akagiri ................. 364/400.01 |
| 5,809,454 A | * 9/1998 | Okada et al. .............. 704/214 |
| 5,822,288 A | 10/1998 | Shinada ...................... 369/54 |
| 5,872,933 A | 2/1999 | Kanai et al. .......... 395/200.61 |
| 5,943,307 A | 8/1999 | Takagi et al. ................. 369/54 |
| 6,061,306 A | 5/2000 | Buchheim ...................... 369/2 |
| 6,292,440 B1 | * 9/2001 | Lee ............................... 369/7 |
| 6,332,175 B1 | * 12/2001 | Birrell et al. ............... 711/112 |
| 6,831,907 B2 | * 12/2004 | Dolman et al. ............. 370/337 |

* cited by examiner

*Primary Examiner*—Gautam R. Patel
(74) *Attorney, Agent, or Firm*—Robert D. Marshall, Jr.; W. James Brady, III.; Frederick J. Telecky, Jr.

(57) ABSTRACT

A method and apparatus for playing compressed audio compact discs in a CD player is provided in which compressed audio data is cached in the local memory of the CD player. If a sufficient amount of compressed audio data is cached in the local memory of the CD player, the CD player can be placed in a reduced power state, reducing the consumption of power by the loader of the CD player. The determination of whether a sufficient amount of compressed audio data is present in the local memory of the CD player is made on the basis of a comparison of the playback time of the unaccessed cached audio and the restart time of the CD player.

16 Claims, 1 Drawing Sheet

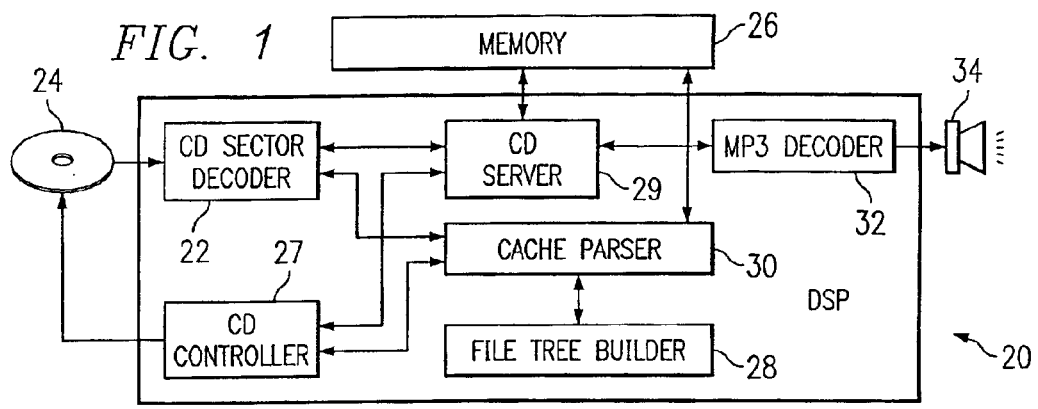
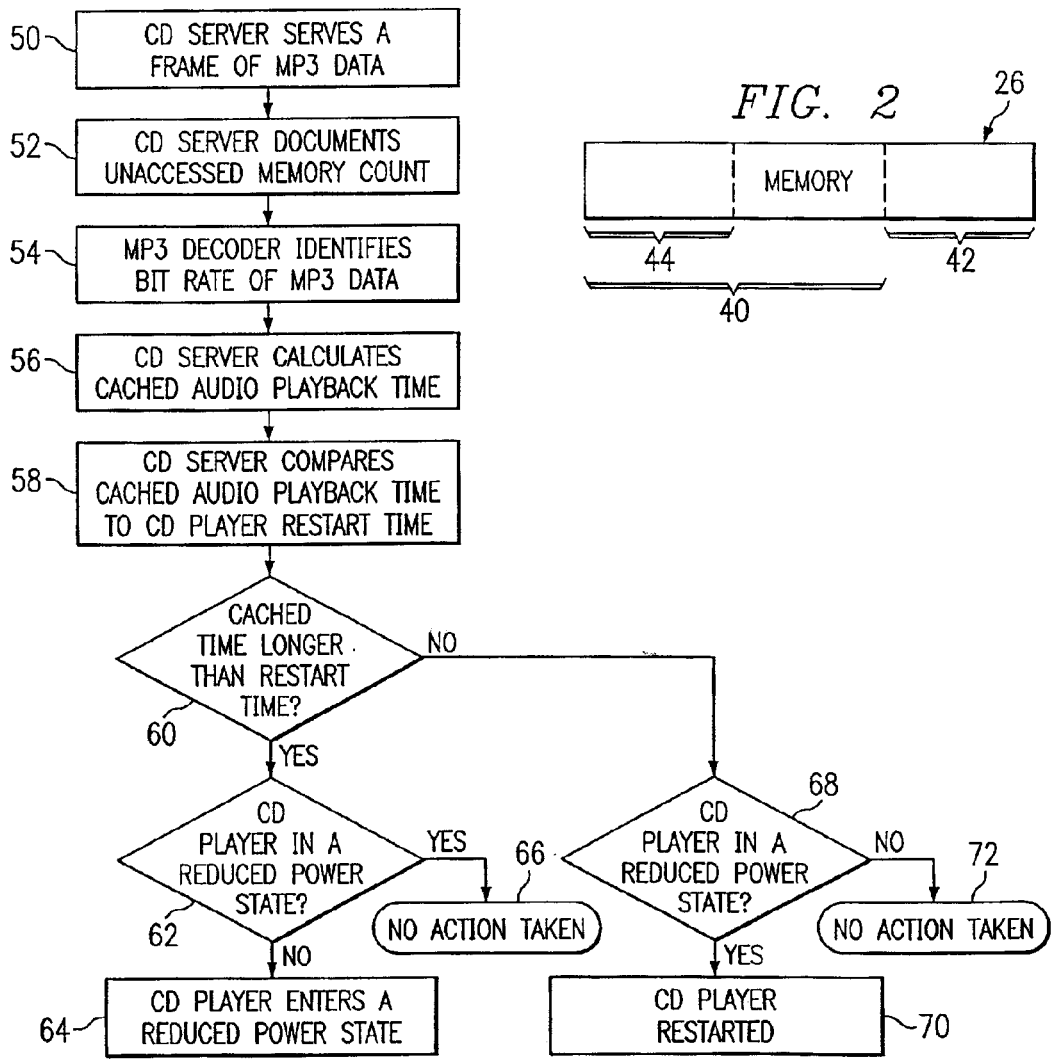

METHOD AND APPARATUS FOR THE REDUCTION OF POWER CONSUMPTION IN A COMPACT DISC PLAYER

This application claims priority under 35 USC §119(e)(1) of Provisional Application No. 60/302,532, filed Jun. 29, 2001.

BACKGROUND OF THE INVENTION

This invention relates in general to the field of compact disc players for playing compressed audio and more particularly to a method and apparatus for reducing the power consumed by a compact disc that is configured to play compressed audio.

BACKGROUND OF THE INVENTION

Portable compact disc players consume large amounts of power to drive the servo motor and laser pickup or tracking mechanism of the player. The servo motor rotates the disc, while the laser pickup or tracking mechanism moves the laser along a pair of rails to read the rotating disc. The battery life of a portable CD player is limited by the mechanical action of the player. The battery life of a typical portable CD player may be as little as fifteen hours on two AA batteries. During the playback of an audio CD player, the disc is rotated continuously rotated so that data is read from the compact disc at a constant bit rate of 1.4 Mb/s or greater.

A compact disc may be formatted to include compressed audio content, such as MP3 files or any other suitable compressed audio format. In the case of the MP3 compressed audio format, as many as 400 music files or songs can be placed on a single compressed audio CD. A CD that includes compressed audio files can be played on a CD player that is configured for the playback of compressed audio files formatted on a CD disc. CD players of this sort include CD-ROM players and hybrid CD players that can play both traditional CDs and CD-ROMs that include compressed audio files. Regardless of the particular compact disc format, CDs that includes compressed audio files are referred to herein as compressed audio CDs.

A compressed audio CD that includes MP3 files can be encoded at a bit rate of between 32 and 320 kb/s, with a typical bit rate of 128 kb/s. Because the mechanical and algorithmic structure of any CD player dictates that the data be read from the disc at a rate of 1.4 Mb/s or greater, a CD player that is playing a compressed audio CD that includes a group of MP3 titles will typically read in data at a rate that is faster than necessary to play the CD. The data is read in by CD played at a rate of 1.4 Mb/s and excess data will be cached in the local memory of the CD player. As such, the CD player receives data at a bit rate that is much greater than the bit rate necessary for the CD to store and process the data for playback. Although the CD player caches data received from the CD, the cache space is limited.

SUMMARY OF THE INVENTION

Accordingly, a need has arisen for a method and apparatus for reducing the consumption of power in a CD player configured to play compressed audio. In accordance with the teachings of the present invention, a method and apparatus for reducing the consumption of power in a CD player is provided that substantially eliminates or reduces the disadvantages and problems associated with prior techniques.

According to one embodiment of the present invention, a CD player configured to play compressed audio is provided with and includes a local memory. Compressed audio is cached for playback in the local memory. As compressed audio is written to and read from the local memory, the CD player maintains a count of the amount of data in local memory. On the basis of this count and the bit rate of the compressed audio, the CD player calculates a cached audio playback time. If the cached audio playback time is longer than the restart time of the CD player, the CD player can be placed in a reduced power state. The reduced power state of the CD player is characterized by a stop or pause state in which the mechanical elements of the CD player do not draw power or draw significantly less power as compared to a fully powered state. The restart time of the CD player is a predefined time that is at least as long as the time required to power the CD player and play audio from a time when the CD player is in a reduced power state.

An important technical advantage of the present invention is a reduction in the consumption of power in the CD player. The present invention provides a technique for placing the CD player in a reduced power state when there is a sufficient amount of compressed audio data cached in the local memory of the CD player. Because a user's audio selection can be played on the basis of the cached compressed audio, the CD player can be placed in a reduced power state, resulting in a reduction in power consumption by the CD loader and a longer battery life in portable CD players.

Another technical advantage of the present invention is a caching scheme that determines when to repower the CD player on the basis of the bit rate of the compressed audio in the local memory of the CD player. The present invention uses the bit rate of the cached audio to calculate the cached audio playback time. The bit rate can be determined on the basis of one of several techniques, including an estimate of the bit rate of the unplayed audio that is a function of the moving average of the played audio content. Because the bit rate is not automatically assumed to be a bit rate at the upper range of the encoding bit rate, the CD player can be powered down for a longer period of time.

BRIEF DESCRIPTION OF THE DRAWINGS

A more complete understanding of the present invention may be acquired by referring to the accompanying figures in which like reference numbers indicate like features and wherein:

FIG. 1 is a functional block diagram of a digital signal processor and memory of a CD player that is configured to play compressed audio files;

FIG. 2 is a diagram of the memory spaces within the local memory of a CD player of the present invention; and FIG. 3 is a flow diagram of a method for evaluating and setting the power state of the CD player following the retrieval of compressed audio data from the cache of the CD player.

DETAILED DESCRIPTION OF THE INVENTION

Shown in FIG. 1 is a functional block diagram of a digital signal processor (DSP) and memory of a CD player, which is indicated generally at 20 and that is configured to play compressed audio files. A CD sector decoder 22 retrieves sectors of data from CD loader and compressed audio CD 24. Following retrieval of one or more sectors, CD sector decoder 22 decodes the sectors of MP3 data. CD sector decoder 22 may perform an error correction routine on the data before storing the data in memory 26, which may be dynamic RAM. The sectors or frames of compressed audio CD 24 may include MP3 audio files. A typical MP3 file is composed of multiple frames of data. The number of compressed audio files that can be stored in the local memory of the CD player is dependent on the length of the file and the bit rate of the file. Compressed audio files that are encoded at high bit rate, such as data encoded at a bit rate of 320 kb/s, will use more memory space than compressed audio files that are encoded at a lower bit rate, such as data encoded at 32 kb/s. Coupled to memory 26 is a CD server 29, which retrieves MP3 data from memory 26 and passes that data to MP3 decoder 32. MP3 decoder 32 converts the compressed audio stream into a 1.4 Mb/s stream for transmission to speaker system 34. As MP3 decoder 32 processes each frame of MP3 data, MP3 decoder 32 identifies the bit rate of the data within the frame and communicates the bit rate to CD server 29.

CD server 29 receives MP3 data requests from MP3 decoder 32. When CD server 29 receives a data request, CD server 29 retrieves the requested MP3 data from memory 26 and transmits the data to MP3 decoder 32. CD server 29 next identifies the amount of unaccessed or unplayed data in memory 26. If the amount of unaccessed or unplayed data within memory 26 is below a predefined memory threshold, CD server 29 communicates with CD controller 27 to request more data from CD 24. This additional data is used to repopulate memory 26.

Placing the mechanical elements of the CD player in a reduced power state reduces the amount of power consumed by the CD player. According to the technique of the present invention, placing the mechanical elements of the CD player in a reduced power state can occur when there is a sufficient amount of compressed audio data in the cache. If the CD player determines that sufficient data is in memory 26, CD player 20 instructs its mechanical elements to go into a reduced power state. In FIG. 1, the mechanical elements of CD player 20 are represented by CD loader 24. The reduced power state of the CD player can be in the form of a pause, stop, or other powered down state in which the primary mechanical elements of the CD player, including the CD servo motor and laser pickup, stop moving and therefore stop drawing power. CD player 20 can enter a reduced power state, however, only if the amount of unplayed compressed audio within memory 26 is above a predefined unplayed audio threshold.

The time required for the CD player to play the remaining unplayed compressed audio in the cache or memory 26 is known as the cached audio playback time. This time period can be calculated by dividing the amount of unplayed compressed audio in memory 26 (in terms of bits) by the encoded bit rate of the data in memory 26. The amount of unplayed compressed audio in the cache is determined by subtracting the amount of data written into the cache by the amount of data read from the cache since the time that memory 26 was last filled. The result of the subtraction is known as the unaccessed memory count The memory count begins or is reset at a time when the entire memory or cache 26 has been filled by CD sector decoder 22.

From this reset point, CD sector decoder 22 counts the amount of data written to memory 26. This count is provided by CD sector decoder 22 to CD server 29. CD server 29 decrements the unaccessed memory count each time that CD server 29 retrieves MP3 data from memory 26. The unaccessed memory count represents the amount of size of unplayed MP3 data in memory 26. After each retrieval of a frame of MP3 data from memory 26, CD server 29 also calculates the cached audio playback time. The cached audio playback time is calculated on the basis of two variables: the unaccessed memory count and the bit rate of the compressed audio in memory 26. The cached audio playback time is the unaccessed memory count (expressed in bits) divided by the bit rate of the compressed audio in the cache.

CD player 20 may be placed in a reduced power state if the cached audio playback time is greater than the CD player restart time. The CD player restart time is the collective time required to fully repower the CD player, determine the target sector to be retrieved from the disc, perform a seek function to position the laser to retrieve the sector, fill memory 26 with compressed audio, and retrieve and process the first segment of compressed audio data for playback through speaker system 34. The CD player restart time will typically also include an additional time cushion to insure that any glitch or delay in restarting the CD player does not affect the quality of audio playback. In sum, the CD player can be put in a reduced power state if the cached data playback time is greater than the CD player restart time. The length of the CD player restart time is a known quantity and can be determined for each CD player. The length of the cached audio playback time, however, will vary because of its dependency on the unaccessed memory count and the bit rate of the compressed audio in memory 26.

A diagram of memory 26 is shown in FIG. 2. Assuming for the sake of this example that compressed audio is written to and read from memory 26 in FIG. 2 from right to left, the unaccessed memory count of memory 26 is shown as the portion 40 of memory 26. The accessed or played memory of memory 26 is memory portion 42. A representation of the memory space associated with the CD player restart time is shown as memory space 44, which in the example of FIG. 2 is a subset of the unaccessed memory space 40. Multiplying the cached audio playback time by the bit rate of the compressed audio in memory 26 gives as a product the amount of data in memory space 40. In practice, CD loader 24 can be placed in reduced power state if memory space 40 is comfortably larger than memory space 44. In the example of FIG. 2, memory space 40 (unplayed compressed audio) is roughly twice as large as memory space 44 (unplayed compressed audio associated with the restart time of the CD player), indicating that the CD player could be placed in a powered down state. If memory space 40 were smaller than memory space 44, CD loader 24 could not be placed in a powered down state, as the time required to restart CD loader 24 would be less than the length of unplayed cached compressed audio. If CD loader 24 is powered down and if the CD player continues to play compressed audio from memory 26, the size of memory space 40 will decrease until it reaches the size of memory space 44. At this point, the CD loader will be restarted so that it can have sufficient time to save to memory 26 the next following data from the CD loader the remainder of the compressed audio in memory space 44 is consumed or played.

A flow diagram is shown in FIG. 3 of a method for evaluating and setting the power state of the CD player following the retrieval of MP3 data from the cache of the CD player. At step 50, CD server 29 retrieves MP3 data from memory 26 and transmits the data to MP3 decoder 32. At step 52, CD server 29 decrements the unaccessed memory count. MP3 decoder 32 identifies to CD server 29 at step 54 the bit rate of the most recently received MP3 data. CD server 29 calculates at step 56 the cached audio playback time by dividing the unaccessed memory count by the bit rate of the most recently received MP3 frame. At steps 58 and 60, CD server 29 compares the cached audio playback time to the CD restart time. If the cached audio playback time is longer than the CD restart time, it is determined at step 62 if the CD player is in a reduced power state. If the CD player is not in a reduced power state, the CD player enters a reduced power state at step 64. If the CD player is already in a reduced power state, no action is taken, as indicated at step 66. If CD server 29 determines at step 60 that the cached audio playback time is the same as or shorter than the CD restart time, CD server 29 determines at step 68 if the CD player is in a reduced power state. If CD player 20 is in a reduced power state, CD player 20 is restarted at step 70 to an active power state. If CD player 20 is not in a reduced power state, no action is taken, as indicated at step 72.

As part of the method described in FIG. 3, CD server 29 may assume for the purpose of calculating the cached audio playback time that the bit rate of the unaccessed MP3 data is the same as the bit rate of the most recently accessed MP3 frame. Although variable bit rate encoding is possible for compressed audio, constant bit rate encoding is more common, making it likely in most instances that the bit rate of unaccessed MP3 data is the same as the bit rate of the most recently processed MP3 frame. As an alternative to calculating the bit rate of the unaccessed MP3 data on the basis of the bit rate of the most recently processed MP3 data, it can be assumed for the sake of calculating the cached audio playback time that the bit rate of the unaccessed MP3 data in memory 26 is 320 kb/s, which is the upper limit of the MP3 encoding range. Calculating the cached audio playback time on the basis of the highest possible bit rate for MP3 data insures that the calculated cached audio playback time is not an overestimate of the actual playback time of the unaccessed audio data. A consequence of calculating the cached audio playback time on the basis of a 320 kb/s bit rate is a calculated cached audio playback time that is less than the actual cached audio playback time, resulting in the CD player spending less time in a powered down state. As another alternative to calculating the bit rate of the unaccessed MP3 data on the basis of the bit rate of the most recently processed MP3 data, the bit rate of the unaccessed data in memory can be estimated on the basis of the average bit rate of accessed data. According to this algorithm, CD server 29 calculates a moving or running average bit rate following the processing of each frame of played MP3 data. The average is used to calculate the cached audio playback time. Spikes or abrupt declines in the moving average bit rate may signal a sudden increase or decrease in the bit rate of data in memory. Using the moving average bit rate technique, CD server 29 may choose to calculate the cached audio playback time on the basis of a higher or lower bit rate to more accurately reflect the bit rate of the unplayed audio in memory.

Although this invention has been described with reference to the MP3 data format, it should be understood that the invention may be employed with any other compressed audio format such that the cache of the MP3 player can be filled, allowing the mechanical elements of the MP3 player to power down for a period of time. Although the present invention has been described in detail, it should be understood that various alterations, changes, modifications, and substitutions may be made to the teachings described herein without departing from the scope of the present invention, which is solely defined by the appended claims.

What is claimed is:

1. A method for reducing the consumption of power in a CD player, comprising the steps of:

reading in compressed audio data from a CD and writing the data to the memory of the CD player;

reading compressed audio data from the memory of the CD player;

decompressing the compressed audio data read from the memory for the CD player for audio playback;

identifying a bit rate of the compressed audio data upon decompression;

calculating a time required to play unplayed data in the memory of the CD player from the amount of unplayed data and the identified bit rate; and placing the CD player in a reduced power state if the time required to play the unplayed data in the memory of the CD player is above a threshold restart level.

2. The method for reducing the consumption of power in a CD player of claim 1, wherein the step of placing the CD player in a reduced power state comprises the step of halting the operation of the motor of the CD player.

3. The method for reducing the consumption of power in a CD player of claim 1, wherein the step of placing the CD player in a reduced power state comprises the step of halting the operation of the tracking mechanism of the CD player.

4. The method for reducing the consumption of power in a CD player of claim 1, further comprising the step of monitoring the amount of unplayed compressed audio data in the memory of the CD player and restarting the CD player once the time required to play the unplayed compressed audio data in the CD player reaches the threshold restart level.

5. The method for reducing the consumption of power in a CD player of claim 4, wherein the threshold restart level is the amount of time required for the CD player to begin the play of a CD from a reduced power state.

6. The method for reducing the consumption of power in a CD player of claim 5, wherein the amount of unplayed data in the memory on the CD player is a function of the difference between the amount of compressed audio data written to the memory of the CD player and the amount of compressed audio data read from the CD player.

7. The method for reducing the consumption of power in a CD player of claim 1, wherein the compressed audio data is in the MP3 format.

8. A method for placing a CD player in a reduced power state, comprising the steps of:

writing compressed audio data from a CD to the local memory of the CD player;

reading compressed audio data from the memory of the CD player;

decompressing the compressed audio data read from the memory for the CD player for audio playback;

identifying a bit rate of the compressed audio data upon decompression;

calculating the length of the unaccessed audio playback time from the amount of unplayed data and the identified bit rate;

comparing the length of the unaccessed audio playback time to a predefined CD player restart time; and placing the CD player in a reduced power state if the length of the unaccessed audio playback time is greater than the predefined CD player restart time.

9. The method for placing a CD player in a reduced power state of claim 8, wherein the step of calculating the length of the unaccessed audio playback time comprises the step of calculating the length of the unaccessed audio playback time as a function of the difference between the compressed audio data written to memory and the compressed audio data read from memory for playback.

10. The method for placing a CD player in a reduced power state of claim 8 wherein the CD player restart time is at least as long as the time necessary to begin the playback of compressed audio following the placement of the CD player in a reduced power state.

11. The method for placing a CD player in a reduced power state of claim 8, wherein the reduced power state is characterized by a reduction in the consumption of power by the loader of the CD player.

12. The method for placing a CD player in a reduced power state of claim 8, wherein the compressed audio format is the MP3 format.

13. The method for placing a CD player in a reduced power state of claim 1, wherein:

the compressed audio data is divided into frames;

the step of decompressing the compressed audio data decompresses the compressed audio data one frame at a time;

the step of identifying bit rate of the compressed audio data upon decompression identifies the bit rate of each decompressed frame; and the step of calculating the time required to play unplayed data in the memory of the CD player divides the amount of unplayed data by the last identified bit rate.

14. The method for reducing the consumption of power in a CD player of claim 1, wherein:

the compressed audio data is divided into frames;

the step of decompressing the compressed audio data decompresses the compressed audio data one frame at a time;

the step of identifying bit rate of the compressed audio data upon decompression identifies the bit rate of each decompressed frame; and the step of calculating the time required to play unplayed data in the memory of the CD player calculates as a function of a moving average bit rate of the identified bit rate of a plurality of frames.

15. The method for reducing the consumption of power in a CD player of claim 8, wherein:

the compressed audio data is divided into frames;

the step of decompressing the compressed audio data decompresses the compressed audio data one frame at a time;

the step of identifying bit rate of the compressed audio data upon decompression identifies the bit rate of each decompressed frame; and the step of calculating the length of the unaccessed audio playback time divides the amount of unplayed data by the last identified bit rate.

16. The method for reducing the consumption of power in a CD player of claim 8, wherein:

the compressed audio data is divided into frames;

the step of decompressing the compressed audio data decompresses the compressed audio data one frame at a time;

the step of identifying bit rate of the compressed audio data upon decompression identifies the bit rate of each decompressed frame; and the step of calculating the length of the unaccessed audio playback time calculates as a function of a moving average bit rate of the identified bit rate of a plurality of frames.

* * * * *